A. MUTSCHELLER
DOSIMETER
Filed Nov. 1, 1932
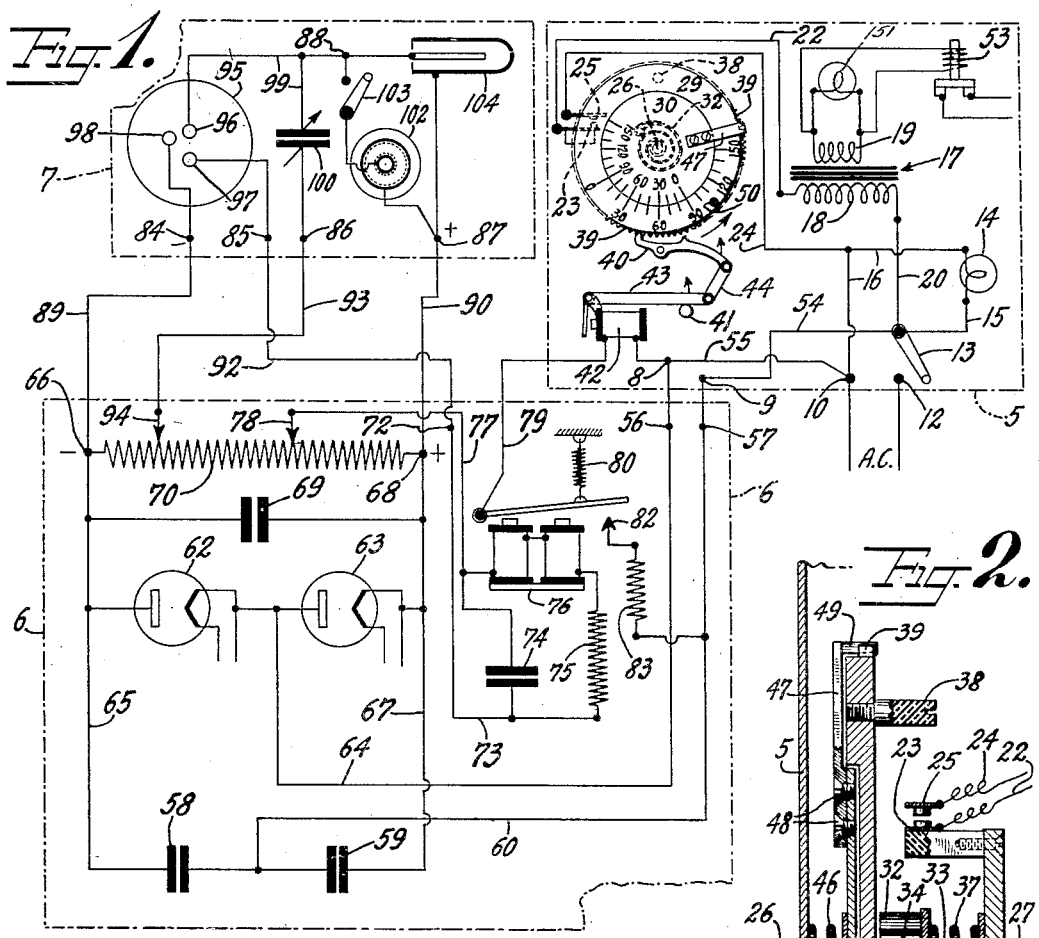
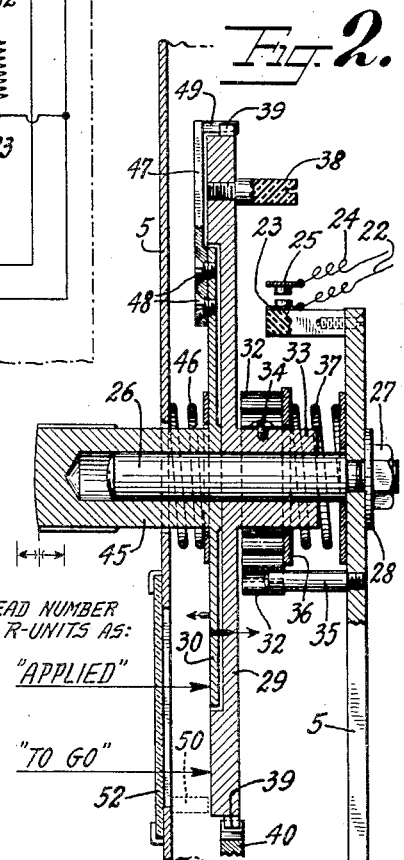
INVENTOR
ARTHUR MUTSCHELLER
BY M. F. Reges
ATTORNEY

UNITED STATES PATENT OFFICE 2,036,072

DOSIMETER

Arthur Mutscheller, New York, N. Y., assignor to Wappler Electric Company, Inc., a corporation of New York Application November 1, 1932, Serial No. 640,643

16 Claims. (Cl. 250—34)

My invention relates to measuring instruments and particularly to what is known to the art as dosimeters. Such devices are commonly employed in connection with the treatment of diseases by generated rays within the invisible regions of the spectrum, such for example as X-rays or ultra violet light rays, wherein it is of utmost importance that a prescribed dosage be applied to a patient. The dosage applied is dependent upon the intensity of the rays emanating from the source and by measuring the intensity for a definite period the dosage is empirically determinable.

Moreover, in radiographing various parts of the human body it is desirable that the resulting film be clear as to definition and uniform density which is unattainable unless the patient and film are exposed to rays of the proper intensity.

Devices of this general type are known to the art, but have not been received with much favor by the roentgenologists due to various objectionable features. The paramount objectionable feature is the unreliability of conventional dosimeters due to variance in the numerous elements comprising the device. The high sensitivity of apparatus of this character makes it essential that no parts of the device influence the operation of the remaining parts or cause any disturbances which would result in the slightest variation of the device as a whole. Should the slightest variation occur an accurate reading or dosage is unattainable, which renders it difficult, if not impossible, for the roentgenologist to ascertain the dosage applied and the patient is thus subjected to possible injury.

In utilizing such devices the greatest disturbing factor is the X-rays or ultra violet light and the mechanism for causing the generation thereof because of the influence of external electric fields in and about the device.

Moreover, the measuring indicators which form a part of the device have not, heretofore, given an exact reading in terms of dosage applied, but it must be empirically determined from the indicator readings. The necessity for this determination is likewise objectionable in that the possibilities of error resulting is ever present and accordingly requires considerable time and care on the part of the roentgenologist in the computation of the dosage applied.

It is accordingly an object of my present invention to provide a dosimeter in which all disturbing influences are entirely eliminated or at least prevented from causing the slightest variation in the operation of any of the numerous parts and the device as a whole.

Another object of my invention is the provision of a dosimeter wherein the quantitative accuracy of the same remains practically constant under all conditions.

Another object of my invention is the provision of a dosimeter which is readily adaptable for accurately measuring the dosage applied to a patient when subjected for treatment to rays of different wave length, such as ultra violet and X-rays.

Another object of my invention is the provision of a dosimeter wherein the roentgenologist can readily determine by visual inspection, the dosage already applied and yet to be applied for any total dosage, at any given interval of time.

A further object of my invention is the provision of a dosimeter wherein standardization of the dosage is initially made and remains constant throughout the entire life of the device.

Still further objects of my invention will become apparent to those skilled in the art by reference to the accompanying drawing wherein, Figure 1 is a diagrammatical representation of my dosimeter showing schematically the mechanical elements of the device and the various electrical circuits and, Figure 2 is a partial cross sectional view in elevation of the indicating mechanism shown schematically in Figure 1.

Referring now to the drawing in detail I have shown in Figure 1 three metallic casings each of which encases various portions of my device. Although I have not shown the constructional details of my dosimeter, as the present application is directed to other features, a brief description thereof may be here stated. The indicating mechanism housed within the casing 5, shown in dot and dash lines in the upper right hand portion of Figure 1, may be positioned at any desired location, for example in a room remote from the treatment room with flexible cables connecting the same to the remainder of the device, or it may be mounted upon the same standard with the rest of the mechanism, as preferred.

The portion housed within the casing 6, shown in dot and dash lines at approximately the center of Figure 1, is mounted upon a standard extending from a base and the latter is provided with suitable rollers or casters to make the apparatus portable.

The portion housed within the casing 7, shown in dot and dash lines in the upper left hand portion of Figure 1, is likewise mounted upon the approximately the height of the usual treatment table.

The member forming a part of this latter portion of the apparatus, which in operation of the device is subjected to the treatment rays, extends outwardly from the casing in order to position the same in the field of radiation during the treatment of a patient without subjecting the remainder of the casing 7 and parts carried thereby to the electric fields about the source and field of radiation. This prevents any disturbing effects to the remainder of the apparatus as the latter is not disposed any nearer the field of radiation than is necessary.

The casing 5, which as before stated may be positioned in any desired location, is provided with suitable electrical terminals 8, 9, 10, and 12. The terminals 10 and 12 are connected to a suitable source of alternating current of the usual commercial potential, as indicated in Figure 1, for supplying electrical energy to the device. A hand switch 13 is carried by the casing 5 to make and break the connection of the device with this source of supply and is shown as establishing a contact with the terminal 12. An illuminating lamp 14 is connected to the blade or terminal of the switch 13, by means of a conductor 15, and a conductor 16 likewise extends from the other supply terminal 10 to the lamp for supplying energy thereto upon closure of the switch.

A low tension transformer 17 is housed within the casing 5 and is provided with a primary winding 18 and a secondary winding 19. The primary winding 18 of this transformer likewise is adapted to receive energy from the source and has one of its ends connected to the switch 13 through a conductor 20. It does not receive energy from the source immediately upon closure of switch 13, however, because its opposite end is connected, by means of a conductor 22, to a stationary contact terminal 23 carried by an insulated block or pin affixed to the casing 5.

A conductor 24 in turn connects a spring contact terminal 25, carried by the casing 5 and disposed adjacent the stationary contact terminal 23, to the conductor 16 and thus to the source of supply. The circuit to the primary winding 18 is accordingly interrupted, even upon closure of the switch 13, as the contacts 23 and 25 are normally open and are closed only upon operation of the indicating mechanism.

Referring now more particularly to Figure 2 it can be seen that the rear wall of the casing 5 is provided with a stud 26 extending laterally therefrom and rigidly secured by a nut 27 and washer 28. A dial 29 is rotatably mounted upon this stud 26 and is provided with a recessed portion in the front face thereof in which an inner dial 30 is positioned to likewise rotate about the stud 26. A spiral spring 32 is radially disposed about a collar portion 33 of the dial 29 and has one of its ends secured in any suitable manner, such as by a screw 34, to this portion of the dial. The other end of this spring 32 loosely surrounds a pin 35 extending from the rear wall of the casing 5 to allow movement of this end of the spring longitudinally of this pin.

A bearing plate 36 maintains the convolutions of the spring 32 in alignment by a coil spring 37 concentrically disposed relative to the stud 26 and collar portion 33 between the bearing plate 36 and the rear wall of casing 5. A contact pin 38 is rigidly secured to the rear face of the dial 29 and upon rotation of the dial, in a counter-clockwise direction, as viewed from Figure 1, performs two functions. It engages the spring contact terminal 25 to cause the latter to establish contact with the stationary terminal 23 and complete the circuit to the primary winding 18, and also acts as a stop to prevent further rotation of the dial in this direction.

The dial 29 is provided about its periphery with ratchet teeth 39 which are engaged by an anchor escapement 40 pivotally secured to the casing 5. A relay 42 has its armature connected to this anchor escapement through toggle links 43 and 44 which rest upon a stop pin 41 fixedly attached to the wall of the casing 5 for the purpose of enabling the latter to allow the potential energy of the spiral spring 32 to rotate the dial as hereinafter more fully explained.

The inner dial 30, which is disposed within the recessed portion of dial 29 with its front face flush with that of the latter, is provided with a collar portion 45 having a recess slightly longer than that required for the stud 26 upon which it is journaled to allow movement of this dial longitudinally of the stud. This collar 45 protrudes a slight distance through the front of the casing 5 to form a regulating knob, which may have a knurled surface for gripping purposes. A coil spring 46 is disposed between the casing 5 and the surface of the dial 30 to normally maintain the latter flush with the dial 29 and in the recess of the latter.

In order to cause movement of both dials simultaneously the inner dial 30 is provided with a bar 47 secured thereto in a suitable manner, such as by screws 48. This bar extends over the face of dial 29 and at its outer extremity is provided with a laterally extending portion 49 which has a depth and pitch corresponding to that of the teeth 39 for engagement therewith. A stop pin 50 extends rearwardly of the front of casing 5 and is engaged by the bar 47 during rotation of dial 30 to prevent further rotation.

It can be noted by reference to Figure 1 that both inner and outer dials are graduated with equal divisions, but are in opposite directions, i. e. the graduations of dial 29 read from left to right while those of dial 30 read from right to left. The front of casing 5 is provided with a transparent window 52 (Figure 2) having a vertically extending hair line centrally disposed thereof which registers with the graduations of both dials and a horizontally extending line is marked upon the front of the casing at the point of visual division between the dials as seen through the window 52. The inner dial 30 indicates the dosage in "r" units applied at any given instant, as noted above the horizontal line and the outer dial the number of "r" units "to go" before the total prescribed dosage has been applied.

This may be best appreciated by assuming that a roentgenologist has determined a total dosage of 90 "r" units is required for a patient and he desires to set the indicating mechanism for that dosage. He pushes inwardly on the knob 45 which moves longitudinally of the stud 26 due to the recess therein being greater than the length of this stud.

Depression of this knob, which is essentially the dial 30, causes corresponding inward movement of dial 29 with the latter forcing the spiral spring 32 longitudinally of the pin 35 against the tension of coil spring 37. This movement accordingly causes the teeth 39 of the dial 29 to disengage the anchor escapement 40 and by rotation of knob 45 the graduation 90, upon ment with the vertical hair line on the window 52. This places the spiral spring 32 under tension and rotation beyond fixed limits is prevented by the bar 47 engaging the stop pin 50.

The operator then releases the inward pressure upon the knob 45 allowing the entire mechanism to assume its normal position. The inner or "applied" dial 30 is next set by the operator pulling slightly on the control knob 45. This movement pulls the dial 30 from its recess within the dial 29 against the tension of the spring 46 and at the same time causes the laterally extending portion or tooth 49 to disengage the ratchet teeth 39. While still maintaining the slight pulling force the knob is again rotated until the "0" graduation on this inner dial 30 is aligned with the hair line which will also align it with the graduation "90" on the outer dial. The stop pin 50 is engaged by the bar 47 in the same manner as before to prevent rotation of this dial to a point beyond the zero when it is rotated in a clockwise direction.

Upon final release of the knob 45 by the operator the outer "to go" dial 29 will read 90 "r" units while the inner or "applied" dial 30 reads "0".

The relay 42 is periodically energized in a manner hereinafter described causing intermittent rocking movement of the anchor escapement 40 through the toggle arms 43 and 44 which are connected to the armature of this relay. During the rocking movement of this anchor escapement about its pivot the potential energy of the spiral spring 32 rotates the dials 29, 30 simultaneously. Should the operator desire to know at any given instant the number of "r" units applied and the quantity still to be applied he need only glance at the indicator. As shown in Figure 1 with the indicator initially set for a total dosage of 90 "r" units after the lapse of a predetermined time period the indicator discloses that 30 "r" units have been applied and 60 units are yet to be applied or "to go".

After the complete dosage has been applied the dials will rotate sufficiently to cause the stop pin 38 to engage the spring contact terminal 25 and cause the latter to establish contact with the stationary contact terminal 23. The primary winding 18 of low tension transformer 17 thus becomes energized (switch 13 having been closed to initiate operation of the entire apparatus) and this in turn energizes the secondary winding 19. This winding is connected to a relay 53 associated with the source of supply to the X-ray tube or ultra violet lamp to open the circuit thereto thus automatically deenergizing the same to prevent further generation of the rays and treatment. Should it be preferred, however, this secondary winding may be connected to a signal light 51 to give a visual indication that the dosage is completed, or to a buzzer (not shown) to give an acoustical indication, which may be employed with the relay or separately and the operator after receipt of this signal discontinues further treatment.

Electrical terminal 9 carried by the casing 5 is directly connected to the blade of switch 13, by means of a conductor 54, and similarly electrical terminal 8 is connected, by means of a conductor 55, to the remaining supply terminal 10.

The relay 42 has one of its ends connected to the terminal 8 and is thus always supplied with energy from one side of the source although the circuit thereto is normally interrupted at another point in my apparatus.

In the metallic casing 6 are a pair of electrical terminals 56 and 57 connected by a flexible cable to the indicator portion of my apparatus just described in detail which is positioned in any location desired as hereinbefore stated. These latter terminals 56 and 57 are connected to the terminals 8 and 9 and as these latter are directly connected to the 110 v. source of supply when the switch 13 is closed, these terminals 56 and 57 may, for the sake of simplicity, be considered as the source of supply to the remainder of my system subject naturally to control by the switch 13.

A high voltage unidirectional generator is housed within the casing 6 and comprises a pair of condensers 58 and 59 with one side of each connected, by means of a conductor 60, to the supply terminal 57. A pair of thermionic rectifying valves 62 and 63 are suitably mounted within the casing 6 and the cathodes are supplied with heating energy from a suitable source (not shown), which may be a low tension transformer or batteries.

The cathode of valve 62 and anode of valve 63 are connected, by a conductor 64, to the remaining supply terminal 56. The remaining side of the condenser 58 is connected to the anode of valve 62, by means of a conductor 65, which extends to a negative terminal 66 carried by the casing 6. In a similar manner the remaining side of condenser 59 is connected to the cathode of the valve 63 by a conductor 67 which extends to a positive terminal 68 also carried by the casing 6. A large capacity condenser 69 is connected between the conductors 65 and 67, as well as a high resistance 70.

The terminals 66 and 68 are accordingly supplied with a negative and positive polarity, respectively, with a potential therebetween equal to 1.41 times that of the supply potential. This is due to the manner in which each half wave of the alternating current cycle is rectified. At a given instant when the conductor 64 is carrying a negative potential and that of the conductor 60 is positive, energy will flow during the half wave of the alternating current cycle through valve tube 62, thus storing energy within the condenser 58. In a similar manner during the remaining half cycle the energy will flow through the valve tube 63 and store energy in the condenser 59 while the energy of condenser 58 is discharging into the load circuit connected to the positive and negative terminals 68 and 66. The condenser 69 is provided for the purpose of enabling part of the discharge of both condensers 58 and 59 to be stored therein with the condenser 69 discharging into the load circuit to reduce the size of the capacity of the respective condensers 58 and 59. Should it be preferred, however, to make the condensers 58 and 59 of larger capacity, which is naturally dependent upon the load, the condenser 69 may be dispensed with.

In this manner of rectifying both half waves of the alternating current cycle, as the condensers 58 and 59 discharge cyclically into the load circuit, the total effective potential of the source of supply is doubled with the peak potential being even slightly greater. Thus by doubling the potential of the source and multiplying this potential by the well known factor of $$\sqrt{2}$$

the maximum peak potential is readily determinable. Accordingly the peak output potential supplied at the terminals 66 and 68; with an effective potential at the source of 110 volts, will be approximately 310 volts which is sufficiently high enough to cause operation of the rest of my system thus dispensing with the necessity for a high tension transformer. The resistance element 70 is provided for the purpose of enabling various voltages to be obtained as hereinafter more fully explained.

The casing 6 is further provided with an electrical terminal 72 and a conductor 73 connects one side of a condenser 74 and a high resistance 75 carried by the casing to this terminal. A relay 76 is rigidly secured to this casing 6 and one end of its winding is connected to the remaining end of the high resistance 75 thus connecting the later in series with the winding of the relay. A conductor 77 connects the remaining end of the winding of relay 76 to a point 78 upon the resistance element 70. This point 78 is adjustable as shown in order to enable the relay to be energized by currents of varying potential, which is normally less than the total output of the source available at the terminals 66, 68. The condenser 74 has its other side connected to the conductor 77 and is accordingly connected in a shunt circuit with the winding of relay 76.

The armature of this relay is connected, by means of a conductor 79, which extends therefrom exteriorly of the casing 6 to the remaining end of the winding of relay 42 carried by the casing 5. This armature of the relay 76 is normally tensioned in the open position by means of a coil spring 80 connected with the casing 6, and upon energization of relay 76 is adapted to establish a connection with a terminal 82. This latter terminal is connected to one end of a resistance element 83 with the other end of the latter connected to the conductor 60 extending from the supply terminal 57. It can thus be readily seen that upon energization of relay 76 with attendant contact of its armature with the terminal 82 the circuit to the winding of relay 42 is completed which in turn causes operation of the anchor escapement 40 as before explained. The resistance element 83 which is connected in series with the winding of relay 42 functions to limit the current supplied to its windings.

The metallic casing 7 is provided with electrical terminals 84, 85, 86, 87, and 88 which are properly insulated therefrom. A flexible cable extends from the casing 6 carried by the portable standard to the casing 7 carried by the upper extremity thereof, as before stated. A conductor 89 connects the negative terminal 66 of casing 6 to the terminal 84 of casing 7 and in a similar manner a conductor 90 connects the positive terminal 68 of casing 6 with the terminal 87 of casing 7. The terminal 72 carried by casing 6 is connected to the terminal 85 of casing 7 by a conductor 92 and similarly a conductor 93 connects the terminal 86 of casing 7 to an adjustable contact terminal 94 carried by casing 6, which is in contact with the high resistance element 70 to enable variable potential to be obtained therefrom.

Mounted within the casing 7 is a glow relay tube 95 of the starting anode type having a starting anode 96, a main anode 97, and a cathode 98. The starting anode 96 is connected, by means of a conductor 99, to the terminal 88 carried by the casing 7 while the cathode 98 is connected to the negative terminal 84 and the main anode electrode 97 is connected to the terminal 85. A variable condenser 100 has one side thereof connected to the terminal 86 while its other side is connected to the conductor 99 extending from the starting anode 96 to the terminal 88. A uranium oxide cell 102 producing a definite rate of ionization, as hereafter more fully explained, has one plate thereof connected to the positive terminal 87 while its other plate is connected, by means of a switch 103 to the terminal 88. An ionization chamber 104, which in the operation of the device is placed in the field of radiation of the X-rays with a patient, has one of its electrodes connected to the terminal 88 while its other electrode is connected to the positive terminal 87.

Although I have shown this ionization chamber 104 as being within the casing 7 for the purposes of simplifying the drawing it is to be understood that the same is normally disposed exteriorly thereof. The same may be affixed to an adjustable arm carried by the casing or connected thereto through a flexible cable in order to prevent the casing with the glow relay tube and uranium oxide cell from being within the field of radiation or subjected to the external electric fields created by the X-rays. Moreover, in employing my dosimeter in the treatment of a patient by ultra violet light rays a photoelectric cell, is substituted for the ionization chamber 104 with the cell connected to the respective terminals 87 and 88 in the same manner as the ionization chamber 104.

The uranium oxide cell 102 has a definite rate of ionization because the rate of production of ions is constant over an extremely long period of time. This ionization of the uranium oxide cell is initially calibrated against a standard ionization chamber in which the rate of ionization is known. In subjecting this standard ionization chamber to X-rays of a predetermined and constant intensity for a given period of time and impressing a definite potential upon the chamber with the volume and spacing between the electrodes of the latter being known, the "$r$" units are readily determinable by means of indicating mechanism connected thereto.

The "$r$" unit is a standard of measurement for X-ray dosages which has been internationally adopted by the roentgenologist. The definition of this unit of X-ray dosage measurement and the prerequisites for determining the same was set forth at the International Congress of Radiology held in Stockholm, Sweden, in July of 1928 and is reported in the October 1929 issue of Radiology XIII 372. While the definition and prerequisites are therein technically set forth the definition may be briefly expressed as "An '$r$' unit or dosage measurement is that quantity of X-rays which produce, for each c. c. of air at 0° C. and at 76 cm. mercury pressure traversed by the X-radiation, one electrostatic unit of charge."

Accordingly by employing a standard ionization chamber, the ionization in terms of "$r$" units of which is known, and connecting this to an indicating mechanism having a definite setting, for a definite period of time each operation of the mechanism will correspond to a definite number of "$r$" units. This may be better understood by arbitrarily assuming certain values as a result of the utilization of the standard or calibrating ionization chamber. If the indicating mechanism at a given setting operates 60 times during a definite period of, say one minute, when the standard ionization chamber is subjected to X-rays of a given intensity, with the ionization of this chamber established at a definite number of "r" units, the indicating mechanism records a total dosage of 120 "r" units or 2 "r" units per operation during the assumed definite time period.

The uranium oxide cell to be calibrated, which as before stated has an inherent definite rate of ionization over a long period of time, is then connected to the indicating mechanism at the same setting in lieu of the standard ionization chamber for the same definite time period here assumed as one minute. Assuming this results in operation of the indicating mechanism 20 times during this same time period an indication accordingly results that the "r" units corresponding to the ionization of the uranium cell is equivalent to a total of 40 "r" units over this same period of time. This initially establishes the "r" units per minute or per operation of the indicating mechanism when the uranium oxide cell is connected thereto which may be marked upon or otherwise recorded for that particular uranium oxide cell. This cell is accordingly standardized as having a definite quantity of "r" units for a definite period of time and is thereafter utilized as a standard for calibrating the ionization chamber of the particular dosimeter with which it is employed.

In the operation of my dosimeter the operator first closes the hand switch 13 carried by the casing 5 which illuminates the pilot light 14 and supplies one side of the source to the primary winding 18 of low tension transformer 17. This latter is not energized, however, as before stated because the circuit thereto is interrupted at the contacts 23, 25 and, although one side of the source is supplied to the winding of relay 42, the circuit thereto is also interrupted at the contact 82 by the armature of relay 76. Upon closure of the switch 13 the contacts 56 and 57 will be supplied with energy directly from the source of supply which will in turn supply unidirectional high potential energy to the positive and negative terminals 68, 66, respectively, as hereinbefore explained.

One plate of the uranium oxide cell 102 is directly connected to the positive terminal 68 of casing 6, through conductor 90 and terminal 87, and is thus impressed with a positive potential. The cathode 98 of glow relay tube 95 is directly connected to the negative terminal 66, through conductor 89 and terminal 84 and is thus supplied with a negative potential, and one side of condenser 100 is connected by terminal 86 and conductor 93 to the variable voltage terminal 94 in contact with the high resistance element 70.

This plate of the condenser 100 is accordingly supplied with a low negative potential relative to the positive terminal 68 and a slight positive potential relative to negative terminal 66.

The hand switch 103 is closed which connects the remaining plate of the cell 102 to terminal 88 and thus to the starting anode 96 of glow relay tube 95 and to one side of the variable condenser 100, which constitutes an input circuit for the glow discharge device. The uranium oxide cell 102, which as before stated has a definite constant rate of ionization or "r" units, will pass a fixed quantity of energy in a definite period of time. This quantity, however, is insufficient to cause breakdown between the starting anode 96 and cathode 98 of glow relay tube 95. The energy will accordingly store up in the condenser 100 as a positive polarity will be impressed upon one plate while its other plate receives a negative polarity from the terminal 94.

When this condenser 100 has become charged to the breakdown voltage of the glow relay tube, with the time period required for the condenser to become fully charged being necessarily dependent upon the rate of ionization within the cell 102, the energy thereof will now be sufficient to cause ionization within the tube 95 with a discharge between the starting anode 96 and the cathode 98.

The characteristics of this type of glow relay tube are such that after breakdown has occurred a much lower potential is required to maintain the discharge than initially required to cause breakdown. Upon breakdown of this tube a discharge will accordingly occur between the cathode 98 and the main anode 97.

This completes a circuit, which may be termed an output circuit for the glow discharge device, as follows: from the negative terminal 66 and conductor 89 to the cathode 98, main anode 97, terminal 85, conductor 92 to one side of condenser 74 and resistance element 75, through this latter resistance to one side of the winding of relay 76 and from the other side of this winding through conductor 77 to the variable voltage terminal 78 which is positive relative to the negative terminal 66.

The relay 76 is accordingly energized and attracts its armature which establishes contact with terminal 82. This then completes the circuit to the winding of relay 42 as follows: from one side of the source of supply through conductor 55 to one end of the winding of this relay 42, through this winding and conductor 79 to the armature of relay 76, thence through resistance element 83 to the terminal 57 which is connected to the other side of the supply source. Relay 42 is accordingly energized and attracts its armature and operates the anchor escapement 40 to rotate the dials 29 and 30 one graduation.

It can be appreciated that the sequence of operation following breakdown of the glow discharge device 95 upon discharge of condenser 100 is periodic and energization of the respective relays 76 and 42 is intermittent. Upon discharge of the energy of condenser 100 the glow relay tube is extinguished thus deenergizing the relays 76 and 42. However, upon extinguishment of the discharge through the glow discharge tube 95 the relay 76 does not immediately become deenergized.

The condenser 74 being shunted across the winding of this relay enables some of the energy supplied to the winding of relay 76 to be stored therein which, after extinguishment of the glow relay tube 95, will discharge through resistance element 75 and the winding of this relay to energize the same for a slightly longer period than the duration of breakdown of the glow relay tube 95.

This arrangement restricts the breakdown of glow relay tube 95 to an extremely short period of time thus avoiding possible injury to the electrode surfaces of the glow relay tube but maintaining energization of the relay 76 for any desired period of time depending upon the capacity of the condenser 74 and the size of the leakage resistance element 75. This causes a positive operation of relay 42, regardless of the length of the connecting cables between the casings 5 and 6, and avoids the usual inaccuracies and unsatisfactory performances normally attendant long relay circuits where the period of operation of the relays are of short duration.

The indicating mechanism of this particular dosimeter in operating gives a definite registration in terms of "r" units for each operation corresponding to each graduation of the dials. Assuming the uranium oxide cell 102 as being the one previously standardized as before explained, wherein it operated 20 times per minute when connected to the standardizing indicating mechanism and was equivalent to a total of 40 "r" units per minute, it now operates the dials 29 and 30, with the condenser 100 at a given setting, 40 times a minute the total "r" units of the cell 102 remains the same, namely, 40 "r" units. However, when the cell was standardized it operated the standardizing mechanism only 20 times per minute for a total indication of 40 "r" units which was equivalent to 2 "r" units per operation, while in the present example with the condenser 100 at its setting and this particular indicating mechanism it operates the latter 40 times per minute for the same total of 40 "r" units thus indicating 1 "r" unit per operation of the indicating mechanism. This accordingly establishes the "r" unit recordation per graduation of the dials for that particular setting of the condenser 100 due to the periodicity of breakdown of the glow discharge device being dependent upon the rapidity with which the condenser is charged and this latter being in turn dependent upon the rate of ionization in a given time period of the cell 102.

The operator having thus determined the "r" units corresponding to each graduation of the dials 29 and 30 will then set the outer dial 29 to the total dosage he desires to give a patient, and the inner dial to "0", as before stated. The hand switch 103 is then opened to disconnect the uranium cell 102 from the system and the ionization chamber 104 is swung into position between the X-ray tube and a patient in order that the chamber may be in the field of radiation. Upon energization of the X-ray tube ionization will occur within the ionization chamber 104 in the same manner as described following ionization within the uranium cell 102.

After the passage of sufficient energy through the ionization chamber 104 in response to the ionization therein by the X-rays impinging thereon the condenser 100 will again be charged and discharge to cause breakdown of the glow discharge tube 95 with attendant operation of the entire device and the periodicity of charging and discharging of the condenser will be dependent upon the rate of ionization within the chamber 104, as just described relative to ionization within the uranium cell 102. With each discharge of the condenser 100 and breakdown of the glow relay tube 95, the indicating mechanism will be operated one graduation. This gives a definite amount of "r" units with each operation and the roentgenologist can, at any given moment, ascertain the total number of units given to the patient and those yet to be applied by merely glancing at the indicating mechanism, as before explained.

Upon completion of the treatment and rotation of the dials a predetermined distance the contacts 23 and 25 are closed to complete the circuit to the primary winding 18 of low tension transformer 17. Energization of this transformer in turn energizes a relay associated with the X-ray tube circuit in the preferred embodiment of my invention to cause deenergization of the X-ray tube.

In lieu of this relay, however, a signal lamp 51 may be energized to give a visual indication that the treatment is completed or a buzzer may be utilized to give an acoustical indication thereof, as before stated.

The "r" units equivalent to each click of the indicating mechanism having been once established for a given setting of the variable condenser 100 remains constant and the uranium cell need not be further utilized for calibrating the device until the setting of the condenser 100 is changed or due to destruction of the glow relay tube 95, the same has to be replaced with a slight variance in the characteristics of the replacement tube from that of the former tube. In this event the operator again connects the uranium cell 102 to the system by the hand switch 103 to calibrate the "r" units equivalent to each click of the indicating mechanism which is readily computed due to the standardization of the cell 102 in terms of "r" units and upon disconnection of the cell therefrom the system operates as before with each click corresponding to a definite quantity of "r" units when the ionization chamber is disposed in the field of radiation.

In order to further obtain distinct and definite clicks of the indicating mechanism, as well as sufficient accuracy of the repetition thereof with uniform radiation doses, it is advantageous to apply a slight positive potential to the variable condenser 100. The discharge through the glow discharge tube 95 takes place at the breakdown voltage thereof, which is slightly higher than that required to sustain the discharge. Immediately after breakdown of the device the potential drops to a certain value which may approximate one third or one half the breakdown potential. This renders the potential impressed upon the starting anode uncertain as the potential left on the condenser 100 would be uncertain.

To rectify this objectionable condition I connect one plate of condenser 100 to the variable voltage terminal 94 through the conductor 93 and terminal 86. The potential thus impressed upon this plate of the condenser is slightly positive relative to the negative supply terminal 66 to which the cathode 98 of the glow discharge tube 95 is connected.

By adjusting the terminal 94 to a potential value equivalent to the potential value of the glow discharge device immediately following breakdown, which may be termed the actual running or operating potential, this latter is definitely fixed and will not fall below this value. This establishes a fixed potential upon the starting anode 96 immediately following breakdown of the glow discharge tube 95 which is equivalent to the normal running potential of the latter. Accordingly the voltage interval between breakdown and normal running is definite and uniform. This results in an increase in the accuracy and quantitative regularity of the clicks or operation of the indicating mechanism. Moreover, by employing the condenser 74 in shunt with the winding of relay 76 and the resistance 75 in series therewith, which together form the load or output circuit of the glow discharge tube 95, the inaccuracies normally attendant long relay circuits is not only eliminated, as before explained, but the distinctiveness of operation of the clicks is increased and interruption of the discharge through the glow discharge tube is rendered definite and uniform.

It is to be understood that in substituting a photo-electric cell in place of the ionization chamber 104 and subjecting the former to ultra violet light rays the operation of my dosimeter is identical with that as just described.

There is, however, this distinction to be noted which is that the reading of the indicating mechanism is no longer in terms of "r" units. This term of measurement is applied only to X-rays and as yet none has been given by scientists to measurement of ultra violet light. The uranium oxide cell 102 is utilized in the same manner, however, to establish a standard rate of ionization and flow of energy into the condenser to ascertain that no variance has occurred in the entire apparatus and, upon subjecting the photo electric cell to ultra violet, each click of the indicating mechanism gives an indication in terms of the rate of ionization of the uranium oxide cell 102 whatever terminology is applied to the ultra violet light dosage.

It can thus be appreciated by those skilled in the art that I have provided a dosimeter in which all disturbing influences tending to cause the slightest variation in the operation are eliminated. Moreover, the device is readily adaptable to the measurement of ultra violet light rays or X-rays and the operator can readily ascertain at any given instant the dosage applied and yet to be applied for a treatment. The device may be standardized once for a given unit of measurement and thereafter accurately record in these units of measurement the dosage applied for each operation of the indicating mechanism which remains constant throughout the entire life of the apparatus.

Although I have shown and described one specific embodiment of my device I do not desire to be limited thereto as various other modifications of the same may be made without departing from the spirit and scope of the appended claims.

What is claimed is:

1. In a dosimeter for measuring applied dosages emanating from a source generating rays within the invisible portions of the spectrum, the combination with a glow discharge device having a definite breakdown characteristic, of means connected to said gow discharge device and operable to periodically cause breakdown thereof, means adapted to be connected to said last mentioned means having a constant definite rate of energy flow corresponding to a predetermined dosage and operable to control the periodicity of operation of said first mentioned means with attendant breakdown of said glow discharge device, indicating mechanism having a graduated scale for recording the dosage applied and to be applied at any given instant for a predetermined total dosage, means operable upon breakdown of said glow discharge device to cause operation of said indicating mechanism for the purpose of calibrating each graduation of said indicating mechanism in terms of dosage corresponding to that of said second mentioned means, means connected to said first mentioned means and adapted to be positioned in the field of radiation of said ray generating source to cause said first mentioned means to periodically cause breakdown of said glow discharge device in proportion to the dosage applied to a patient with attendant operation of said indicating mechanism, and means operable by said indicating mechanism for signifying the completion of the desired total dosage.

2. In a dosimeter for measuring applied dosages emanating from a source generating rays within the invisible portions of the spectrum, the combination with a glow discharge device having a definite breakdown characteristic, of energy storage means connected to said glow discharge device and operable to periodically cause breakdown thereof, means adapted to be connected to said energy storage means having a constant definite rate of energy flow corresponding to a predetermined dosage and operable to control the periodicity of operation of said energy storage means with attendant breakdown of said glow discharge device, indicating mechanism operable to record the dosage applied and to be applied at any given instant for a predetermined total dosage, an output circuit including said glow discharge device and adapted to be completed by breakdown of said discharge device, means operable by said output circuit to cause operation of said indicating mechanism in order to predetermine the dosage corresponding to each operation of said indicating mechanism in response to operation of said first mentioned means, and an ionization chamber connected to said energy storage means and adapted to be positioned in the field of radiation of said ray generating source to control the periodic operation of said energy storage means with attendant breakdown of said glow discharge device and operation of said indicating mechanism in proportion to the dosage applied to a patient, and a circuit adapted to be completed by said indicating mechanism for operating electrical apparatus to signify the completion of the desired total dosage.

3. In a dosimeter for measuring applied dosages emanating from a source generating rays within the invisible portions of the spectrum, the combination of a glow discharge device having a definite breakdown characteristic, a condenser connected to said glow discharge device and operable to cause periodic breakdown of the latter, a circuit for charging said condenser including a source of potential and means having a constant definite rate of energy flow corresponding to a predetermined dosage for controlling the periodicity of operation of said condenser with attendant breakdown of said glow discharge device, indicating mechanism operable to register the dosage applied and to be applied at any given instant for a predetermined total dosage, an output circuit for said glow discharge device, and means operable by said output circuit upon breakdown of said glow discharge device to cause operation of said indicating mechanism to determine the dosage equivalent to each operation of said indicating mechanism in accordance with the operation of said first mentioned means, a second circuit for charging said condenser including means positioned in the field of radiation of said ray generating source to control the periodic operation of said condenser with attendant breakdown of said glow discharge device and to cause operation of said last mentioned means with attendant operation of said indicating mechanism for recording the dosage applied to a patient, and a circuit adapted to be completed by operation of said indicating mechanism for signifying the completion of the desired dosage.

4. In a dosimeter for measuring applied dosages emanating from a source generating rays within the invisible portions of the spectrum, the combination with a glow discharge device having a definite breakdown characteristic, means connected to said glow discharge device and operable to periodically cause breakdown thereof, standardizing means adapted to be connected to said first mentioned means having a constant definite rate of energy flow corresponding to a predetermined dosage and operable to control the periodicity of operation of said first mentioned means with attendant breakdown of said glow discharge device, and means connected to said first mentioned means and adapted to be positioned with a patient in the field of radiation of said ray generating source to control the periodicity of operation of said first mentioned means with attendant breakdown of said glow discharge device in response to the applied dosage, of indicating mechanism provided with a dial for recording the dosage applied and a dial for recording the dosage to be applied at any given instant for a predetermined total dosage, and means energizable upon breakdown of said glow discharge device in response to the operation of said first mentioned means when said standardizing means is connected thereto to cause operation of said indicating mechanism in order to calibrate the same in terms of dosage corresponding to that of said standardizing means, and said means being energizable upon breakdown of said glow discharge device when said third mentioned means is positioned in the field of radiation to cause operation of said indicating mechanism and record the dosage applied to a patient.

5. In a dosimeter for measuring applied dosages emanating from a source generating rays within the invisible portions of the spectrum, the combination with a glow discharge device having a definite breakdown characteristic, means connected to said glow discharge device and operable to periodically cause breakdown thereof, standardizing means adapted to be connected to said first mentioned means having a constant definite rate of energy flow corresponding to a predetermined dosage and operable to control the periodicity of operation of said first mentioned means with attendant breakdown of said glow discharge device, and means connected to said first mentioned means and adapted to be positioned with a patient in the field of radiation of said ray generating source to control the periodicity of operation of said first mentioned means with attendant breakdown of said glow discharge device in response to the applied dosage, of indicating mechanism provided with a dial for recording the dosage applied and a dial for recording the dosage to be applied at any given instant for a predetermined total dosage, means energizable upon breakdown of said glow discharge device in response to the operation of said first mentioned means when said standardizing means is connected thereto to cause operation of said indicating mechanism in order to calibrate the same in terms of dosage corresponding to that of said standardizing means, said means being energizable upon breakdown of said glow discharge device when said third mentioned means is positioned in the field of radiation to cause operation of said indicating mechanism and record the dosage applied to a patient, and means associated with said indicating mechanism and operable thereby to signify the completion of the desired dosage.

6. In a dosimeter for measuring applied dosages emanating from a source generating rays within the invisible portions of the spectrum, the combination with a glow discharge device having a definite breakdown characteristic, means connected to said glow discharge device and operable to periodically cause breakdown thereof, standardizing means adapted to be connected to said first mentioned means having a constant definite rate of energy flow corresponding to a predetermined dosage and operable to control the periodicity of operation of said first mentioned means with attendant breakdown of said glow discharge device, and means associated with said first mentioned means and adapted to be positioned with a patient in the field of radiation of said ray generating source to control the periodicity of operation of said first mentioned means with attendant breakdown of said glow discharge device in response to applied dosage, of indicating mechanism operable to record the dosage applied and to be applied at any given instant for a predetermined total dosage comprising a dial adapted to be preset for a desired total dosage and to record the dosage yet to be applied after the application of any fractional part of a total dosage, a second dial adapted to be preset and to move simultaneously with said first dial for recording any fractional part of a dosage already applied, means energizable upon breakdown of said glow discharge device to cause operation of said indicating mechanism in order to calibrate the same and record the dosage applied to a patient, and a pair of contact members positioned adjacent said dials and adapted to be closed by rotation of the latter and to complete an electrical circuit to signify completion of the desired total dosage.

7. In a dosimeter for measuring applied dosages emanating from a source generating rays within the invisible portions of the spectrum, the combination of a glow discharge device having a definite breakdown characteristic, an input circuit for said glow discharge device including means operative to cause periodic breakdown thereof and means adapted to be positioned with a patient in the field of radiation of said ray generating source to control the periodicity of operation of said first mentioned means in accordance with the applied dosage, means adapted to be included in said input circuit having a constant definite rate of energy flow corresponding to a predetermined dosage and operable to control the periodicity of operation of said first mentioned means with attendant breakdown of said glow discharge device, indicating mechanism operable to record the dosage applied and to be applied at any given instant for a predetermined total dosage, means disposed in operable relation with said indicating mechanism to cause operation thereof, an output circuit for said glow discharge device including means energizable upon breakdown thereof to cause operation of said last mentioned means with attendant operation of said indicating mechanism, to predetermine the dosage corresponding to each operation of said indicating mechanism in response to operation of said input circuit, when said means having a constant definite rate of energy flow is included therein, and said indicating mechanism being operable to record the total dosage when said second mentioned means is positioned with a patient in the field of radiation of said ray generating source.

8. In a dosimeter for measuring applied dosages emanating from a source generating rays within the invisible portions of the spectrum, the combination of a glow discharge device having a definite breakdown characteristic, an input circuit for said glow discharge device including means operative to cause periodic breakdown thereof and means adapted to be positioned with a patient in the field of radiation of said ray generating source to control the periodicity of operation of said first mentioned means in accordance with the applied dosage, means adapted to be included in said input circuit having a constant predetermined dosage for controlling the periodicity of operation of said first mentioned means with attendant breakdown of said glow discharge device, indicating mechanism operable to record the dosage applied and to be applied at any given instant for a predetermined total dosage, means disposed in operable relation with said indicating mechanism for causing operation thereof, an output circuit for said glow discharge device including means energizable to cause closure of a pair of contact members, an electrical circuit including said last mentioned contact members and operable upon closure thereof to cause operation of said last mentioned means with attendant operation of said indicating mechanism, and an electrical circuit including a pair of contact members adapted to be closed by operation of said indicating mechanism for energizing electrical apparatus to signify completion of a desired total dosage.

9. In a dosimeter for measuring applied dosages emanating from a source generating rays within the invisible portions of the spectrum, the combination of a glow discharge device having a definite breakdown characteristic, an input circuit for said glow discharge device including means operative to cause periodic breakdown thereof and means adapted to be positioned with a patient in the field of radiation of said ray generating source, a second input circuit adapted to be connected to said glow discharge device including means having a constant definite rate of energy flow corresponding to a predetermined dosage and operable to control the periodicity of operation of said first mentioned means with attendant breakdown of said glow discharge device, indicating mechanism operable to record the dosage applied and to be applied at any given instant for a predetermined total dosage, means disposed in operable relation with said indicating mechanism for causing operation thereof, an output circuit for said glow discharge device including means energizable upon breakdown thereof to cause operation of said last mentioned means with attendant operation of said indicating mechanism and means operative to energize said means included in said output circuit for a period of time longer than the duration of breakdown of said glow discharge device, and means associated with said indicating mechanism and operable thereby to signify the completion of a desired total dosage.

10. In a dosimeter for measuring applied dosages emanating from a source generating rays within the invisible portions of the spectrum, the combination of a glow discharge device having a definite breakdown characteristic, an input circuit for said glow discharge device including energy storage means operative to cause periodic breakdown thereof and an ionization chamber adapted to be positioned with a patient in the field of radiation of said ray generating source, a second input circuit adapted to be connected to said glow discharge device including a discharge device having a constant definite rate of energy flow corresponding to a predetermined dosage and operable to control the periodicity of operation of said energy storage means with attendant breakdown of said glow discharge device, indicating mechanism operable to record the dosage applied and to be applied at any given instant for a predetermined total dosage, means disposed in operable relation with said indicating mechanism for causing operation thereof, an output relay energizable upon breakdown thereof to cause operation of said means with attendant operation of said indicating mechanism and a condenser operative to energize said relay for a period of time longer than the duration of breakdown of said glow discharge device, and means associated with said indicating mechanism and operable thereby to signify the completion of a desired total dosage.

11. In a dosimeter for measuring applied dosages emanating from a source generating rays within the invisible portions of the spectrum, the combination of a glow discharge device provided with a cathode, an anode, and a starting anode and having a definite breakdown characteristic, an input circuit for said glow discharge device including a condenser operative to cause periodic breakdown thereof, a source of energy for charging said condenser with a potential having a polarity slightly positive relative to the cathode of said glow discharge device, and means adapted to be connected to said source and said condenser having a constant definite rate of energy flow corresponding to a predetermined dosage and operable to control the periodicity of operation of said condenser with attendant breakdown of said glow discharge device; a second input circuit for said glow discharge device including a source of energy for charging said condenser with a potential having a polarity slightly positive relative to the cathode of said glow discharge device to limit the potential value following breakdown of the latter, and an ionization chamber adapted to be positioned with a patient in the field of radiation of said ray generating source to control the periodicity of operation of said condenser with attendant breakdown of said glow discharge device in accordance with the applied dosage; indicating mechanism operable to record the dosage applied and to be applied at any given instant for a predetermined total dosage, an output circuit for said glow discharge device, means disposed in operable relation with said indicating mechanism and operable upon energization thereof to cause operation of said indicating mechanism, a relay in said output circuit energizable upon breakdown of said glow discharge device to cause operation of said last mentioned means with attendant operation of said indicating mechanism, a condenser and a resistance in said output circuit and operable to energize said relay for a period of time longer than the duration of breakdown of said glow discharge device, and means associated with said indicating mechanism and operable thereby to signify the completion of a desired total dosage.

12. In a dosimeter for measuring applied dosages emanating from a source generating rays within the invisible portions of the spectrum, the combination of a glow discharge device having a definite breakdown characteristic, a condenser connected to said glow discharge device and operable to cause periodic breakdown thereof, generating means connected to said condenser for charging the latter with unidirectional electrical energy comprising a source of alternating current electrical energy of commercial potential, a plurality of discharge devices and a plurality of condensers connected to said alternating current source for rectifying each half wave of the alternating current cycle and superimposing the potential of one half wave upon that of the remaining half wave to double the potential of mentioned condenser; a discharge device having a constant definite rate of energy flow corresponding to a predetermined dosage connected to said generating means and adapted to be connected to said condenser and operable to control the periodicity of operation of said condenser with attendant breakdown of said glow discharge device, an ionization chamber connected to said generating means and said condenser and adapted to be positioned with a patient in the field of radiation of said ray generating source to control the periodicity of operation of said condenser and glow discharge device in accordance with the applied dosage, indicating mechanism operable to record the dosage applied and to be applied at any given instant for a predetermined total dosage, means disposed in operable relation with said indicating mechanism and operably associated with said generating means for causing operation of said indicating mechanism, a relay connected to said generating means and energizable by the same upon breakdown of said glow discharge device to initiate operation of said last mentioned means and cause operation of said indicating mechanism, and an auxiliary circuit adapted to be closed by operation of said indicating mechanism to energize electrical apparatus for signifying completion of a desired total dosage.

13. In a dosimeter for measuring applied dosage emanating from a source generating rays within the invisible portions of the spectrum, the combination of a glow discharge device having a definite breakdown characteristic, an input circuit for said glow discharge device including a radiation responsive device and a condenser operable when predeterminedly charged to periodically cause breakdown of said glow discharge device, means adapted to be connected to said condenser having a constant definite rate of energy flow corresponding to a predetermined dosage and operable to control the periodicity of operation of said condenser with attendant breakdown of said glow discharge device, an output circuit for said glow discharge device, indicating mechanism operable to record the dosage applied and to be applied at any given instant for a predetermined dosage, and means operable by said output circuit for causing operation of said indicating mechanism.

14. In a dosimeter for measuring applied dosage emanating from a source generating rays within the invisible portions of the spectrum, the combination of a glow discharge device having a definite breakdown characteristic, an input circuit for said glow discharge device including a radiation responsive device and a condenser operable when predeterminedly charged to periodically cause breakdown of said glow discharge device, means adapted to be connected to said condenser having a constant definite rate of energy flow corresponding to a predetermined dosage and operable to control the periodicity of operation of said condenser with attendant breakdown of said glow discharge device, an output circuit for said glow discharge device, indicating mechanism operable to record the dosage applied and to be applied at any given instant for a predetermined dosage, means operable by said output circuit for causing operation of said indicating mechanism, and means associated with said indicating mechanism and operable thereby to signify completion of a desired total dosage.

15. In a dosimeter for measuring applied dosage emanating from a source generating rays within the invisible portions of the spectrum, the combination of a glow discharge device having a definite breakdown characteristic, an input circuit for said glow discharge device including a radiation responsive device, a condenser periodically operable when charged to the breakdown value of said glow discharge device to cause breakdown thereof, and a source of potential for definitely limiting the discharge of said condenser to a fixed minimum; an output circuit for said glow discharge device, indicating mechanism operable to record the dosage applied and to be applied at any given instant for a predetermined dosage, and means operable by said output circuit for causing operation of said indicating mechanism.

16. In a dosimeter for measuring applied dosages emanating from a source generating rays within the invisible portions of the spectrum, the combination of a glow discharge device having a definite breakdown characteristic, an input circuit for said glow discharge device including a radiation responsive device, a condenser periodically operable when charged to the breakdown value of said glow discharge device to cause breakdown thereof, and a source of potential for definitely limiting the discharge of said condenser to a fixed minimum; indicating mechanism operable to record the dosage applied and to be applied at any given instant for a predetermined dosage, an output circuit for said glow discharge device including means operable to cause current flow in said output circuit for a longer period of time than the duration of breakdown of said glow discharge device, and means operable by said output circuit to cause operation of said indicating mechanism.

ARTHUR MUTSCHELLER.